United States Patent
Chalhoub et al.

(10) Patent No.: US 9,213,336 B2
(45) Date of Patent: Dec. 15, 2015

(54) GUIDANCE AND CONTROL SYSTEM FOR UNDER-ACTUATED MARINE SURFACE SHIPS AND OTHER AUTONOMOUS-PLATFORMS

(75) Inventors: Nabil Chalhoub, Canton Township, MI (US); Nassim Khaled, Columbus, IN (US)

(73) Assignee: Wayne State University, Detroit, MI (US)

( * ) Notice: Subject to any disclaimer, the term of this patent is extended or adjusted under 35 U.S.C. 154(b) by 181 days.

(21) Appl. No.: 13/821,631

(22) PCT Filed: Sep. 12, 2011

(86) PCT No.: PCT/US2011/051204
§ 371 (c)(1),
(2), (4) Date: Mar. 8, 2013

(87) PCT Pub. No.: WO2012/034119
PCT Pub. Date: Mar. 15, 2012

(65) Prior Publication Data
US 2013/0173096 A1    Jul. 4, 2013

Related U.S. Application Data

(60) Provisional application No. 61/381,959, filed on Sep. 11, 2010, provisional application No. 61/382,233, filed on Sep. 13, 2010.

(51) Int. Cl.
G05D 1/02    (2006.01)
B63J 99/00   (2009.01)

(52) U.S. Cl.
CPC ............... *G05D 1/0206* (2013.01); *B63J 99/00* (2013.01); *B63J 2099/008* (2013.01)

(58) Field of Classification Search
CPC ......... G05D 1/0206; G05D 1/02; B63J 99/00; B63J 2099/008
See application file for complete search history.

(56) References Cited

U.S. PATENT DOCUMENTS

| 4,253,149 A | 2/1981 | Cunningham et al. |
| 6,433,736 B1 | 8/2002 | Timothy et al. |

(Continued)

OTHER PUBLICATIONS

Khaled et al., "Guidance and Control Scheme for Under-Actuated Marine Surface Vessels," In: American Control Conference Marriot Waterfront, Baltimore, MD, Jun. 30-Jul. 2, 2010, pp. 5230-5235.

(Continued)

*Primary Examiner* — John Q Nguyen
*Assistant Examiner* — Michael Kerrigan
(74) *Attorney, Agent, or Firm* — Brooks Kushman P.C.

(57) ABSTRACT

A computer implemented method for guiding an under-actuated marine surface vessel in tracking a desired trajectory comprises expressing a predetermined vessel trajectory as a set of straight line segments, determining a desired current line segment, and determining the vessel's current position. A cross-track error and the derivative of the cross-track error are then determined. Next, a radius R of the line-of-sight (LOS) circle using a newly introduced exponential function is determined. Intersection points M and N between the LOS circle and the current desired line segment are determined. A desired heading angle is determined as the angle between the line of sight and a predetermined fixed reference line. A drift detection algorithm is built into the proposed guidance scheme to detect situations whereby the ship moves parallel to its desired trajectory for an extended period of time without being able to correct for the cross track error.

16 Claims, 5 Drawing Sheets

(A) Without a drift detection scheme.

(B) With a drift detection scheme.

(56) References Cited

U.S. PATENT DOCUMENTS 6,611,737 B1    8/2003   El-Tahan et al.
2010/0023192 A1  1/2010   Rae et al.

OTHER PUBLICATIONS

International Search Report mailed Apr. 10, 2012 in PCT/US2011/051204 filed Sep. 12, 2011, 3 pgs.

Breivik, M., "Nonlinear Maneuvering Control of Underactuated Ships, Master Thesis, Norwegian University of Science and Technology", 2003, pp. 1-117.

Fossen, T. I. et al., "Line-Of-Sight Path Following of Underactuated Marine Craft", 2003, pp. 244-249, Girona, Spain.

Khaled, N. et al., "Self Tuning Fuzzy Sliding Controller for the Ship Heading Problem", 2010, pp. 1-6, Cambridge, Massachusetts.

Moreira, L. et al., "Path Following Control System for a Tanker Ship Model", 2007, pp. 2074-2085.

(A) Without a drift detection scheme.

(B) With a drift detection scheme.

GUIDANCE AND CONTROL SYSTEM FOR UNDER-ACTUATED MARINE SURFACE SHIPS AND OTHER AUTONOMOUS-PLATFORMS

CROSS-REFERENCE TO RELATED APPLICATION

This application claims the benefit of U.S. provisional application Ser. No. 61/381,959 filed Sep. 11, 2010 and Ser. No. 61/382,233 filed Sep. 13, 2010.

STATEMENT REGARDING FEDERALLY SPONSORED RESEARCH OR DEVELOPMENT

The invention was made with Government support under Contract No. N00014-05-1-0040. The Government has certain rights to the invention.

BACKGROUND OF THE INVENTION

1. Field of the Invention

The present invention is related to methods and systems for guiding and controlling marine surface ship or other autonomous platforms.

2. Background

The development of autonomous marine surface vessels (i.e., ships) necessitates the integration of the guidance system with the control algorithm. This is particularly true for under-actuated vessels in which the system has six rigid body degrees of freedom while the control actions are limited to the propeller thrust and the rudder torque. The propeller thrust is devoted for the surge speed control. The rudder torque yields the desired rudder angle of attack, which is relied on to steer the marine vessel to the desired trajectory. Coupling the controller with the guidance system enables the steering control problem to simultaneously address control issues pertaining to sway displacement and ship heading.

A guidance system should provide a desired heading angle that aims at reducing the distance between the current location of the ship and the desired trajectory. Such a distance is referred to as the cross-track error. A guidance system based on the line-of-sight (LOS) concept are known in the prior art. These initial LOS guidance systems incorporate a constant radius thereby rendering such systems inapplicable whenever the cross-track error exceeds the radius. More recent LOS guidance systems have proposed varying the radius linearly with the cross-track error. This enables such guidance systems to cope with any cross-track error.

Accordingly, there is a need for improved methods and systems of guiding and controlling a marine surface vessel trajectory.

SUMMARY OF THE INVENTION

The present invention improves on the current and solves one or more problems of the prior art by providing in at least one embodiment a computer implemented method for guiding and controlling an under-actuated marine surface ship or other autonomous platforms. The method comprising expressing a predetermined vessel or other autonomous platform (collectively referred to herein as a "vessel") trajectory as a set of straight line segments, determining a desired current line segment, and determining the vessel's current position. A cross-track error and the derivative of the cross-track error is then determined. The cross-track error is the distance between the current location of the ship and the desired trajectory. Next, a radius R of the line-of-sight (LOS) circle using a newly introduced exponential function is determined. Intersection points M and N between the LOS circle and the current desired line segment are determined. The line-of-sight is defined as the line joining the vessel center to the forward looking intersection point N. A desired heading angle is determined as the angle between the line of sight and a predetermined fixed reference line. The desired heading angle is provided to a vessel's heading controller. A drift is detected whenever the ship moves parallel to its desired trajectory for an extended period of time without being able to approach it. The drift detection algorithm is a built-in feature within the proposed guidance scheme to aid the ship controller in correcting for the ship drifting motion. It continuously monitors the cross track error and its time derivative in order to detect the presence of a drift and modify the line-of-sight (LOS) radius accordingly. This scheme is always active except in the vicinity of the way points.

In another embodiment, system implementing the method set forth above is provided. The system includes a computer processor, memory, and digital storage devices. The computer processor executes the method of guiding and controlling an under-actuated vessel.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 1:
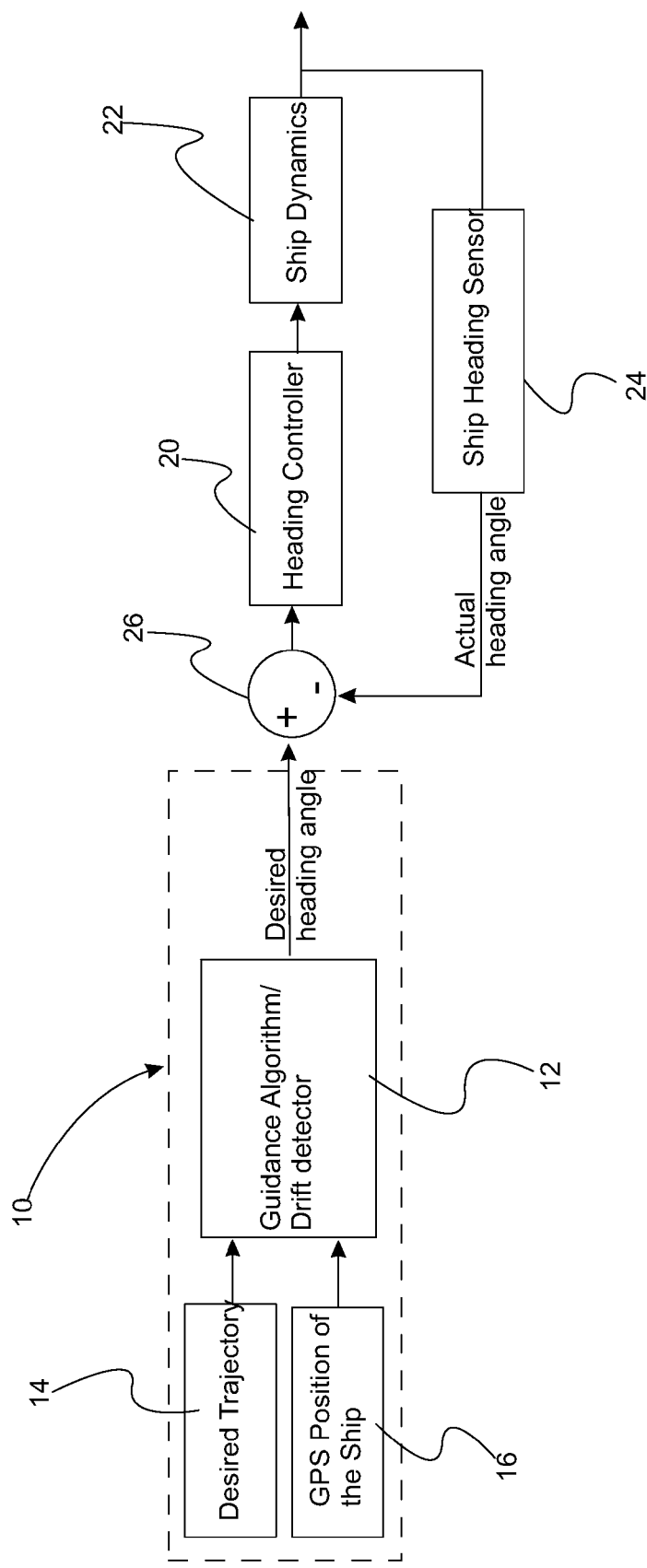
FIG. 1 is a schematic of a guidance and control system for controlling marine surface vessels or other autonomous platforms.

With reference to FIG. 1, a block diagram of a system that implements a method for guiding and controlling under-actuated marine surface ships or other autonomous platforms (collectively referred to herein as vessels) is provided. As used herein an autonomous platform is any platform or system that is operable (e.g., movable along a trajectory) without human intervention. Examples of autonomous systems include, but are not limited to, marine surface vessels, robots, submarines, and the like. Guidance system 10 includes computer system 12 which executes the guidance method set forth below. Typically, computer system 12 includes a computer processor, memory, and storage devices. The computer process implements the instructions for the method set forth below. The actual computer instructions are stored in memory and/or on the storage devices. Desired trajectory information is inputted into computer system 12 as depicted by Box 14. Similarly, the GPS position of the vessel being controlled is also inputted into computer system 12 as depicted by Box 16. Computer system 12 determines a desired heading angle by the methods of the present invention. This heading angle is then provided to vessel heading controller 20 that adjusts a vessel's navigation device (e.g., a rudder) so as to achieve the desired heading angle. The vessel also typically includes a locomotion device (e.g., a propeller) in order to move the vessel.

Still referring to FIG. 1, heading controller 20 implements two layers of control. The first layer of the controller is designed based on the equations of motion pertaining to the surge and yaw motions of the vessel. This layer provides a rudder angle to achieve the desired heading angle. The second layer provides a determination of the order to compute the control torque of the rudder to achieve the desired heading.

Still referring to FIG. 1, the resulting alteration of the vessel's heading angle and associated travel are represented by Box 22. Vessel heading sensor 24 monitors the vessel's actual heading angle which is fed back to heading controller 20 as represented by item number 26.

Figure 2:
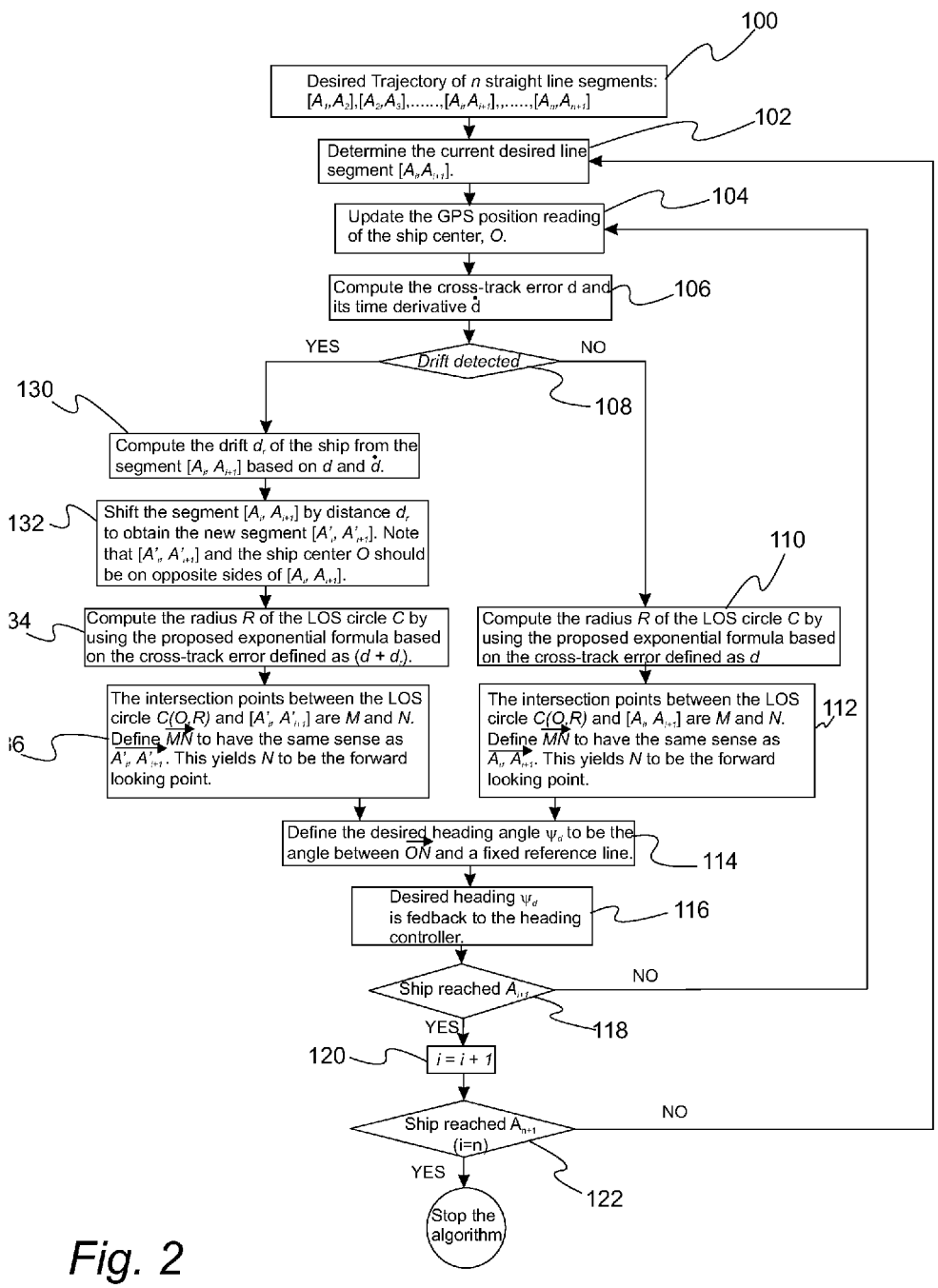
FIG. 2 is a flowchart illustrating a method for guiding marine surface vessels or other autonomous platforms.

With reference to FIG. 2, a flowchart illustrating a method of controlling a marine vessel's trajectory is provided. As set forth in Box 100, a desired trajectory is expressed as a set of n straight line segments:

$$[A_1, A_2], [A_2, A_3], \ldots [A_i, A_{i+1}], \ldots [A_n, A_{n+1}]$$

The current desired line segment is then determined (Box 102). The vessel's current position is then determined as set forth in Box 104. The cross track error d and its time derivative are determined in Box 106. The cross-track error as used herein is defined as the distance between the current location of the vessel and the desired trajectory.

A determination is then made as to whether or not drift detection is to be included in the determination of a desired vessel's heading (decision box 108). If drift detection is not to be implemented, the radius R of the line-of-sight (LOS) circle is calculated using the exponential formula (Box 110):

$$R = d + \sqrt{2} R'_{min} e^{-bx'_B} \quad (1a)$$

$$R'_{min} = 2^{-0.5} R_{min} d^{2^{-0.5} b R_{min}} \quad (1b)$$

$$x'_B = b^{-1}[\text{lambertw}(bR'_{min} e^{-(0.5\sqrt{2}bd)}) + 0.5\sqrt{2}bd] \quad (1c)$$

where Lambert-W function (lambertw) is the inverse of $f(x) = xe^x$. $R_{min}$ is the minimum radius (and it is a tuning parameter), d is the cross track error, and b is a parameter controlling the decay rate of the exponential term (and it is a tuning parameter). In a variation, $R_{min}$ is 1.7L where L is the length of the ship, and b is 0.05. The tuning parameters are chosen to provide an optimum convergence to the path that satisfy two conditions—minimum convergence time to the path and after convergence, no oscillations of the ship around the desired trajectory.

The intersection points M and N between the LOS circle C(O, R) (center of flotation of the vessel O, radius R) and the current desired line segment $[A_i, A_{i+1}]$ are determined as shown in Box 112. The intersection points M, N are used to define a line segment [M, N] having the same sense as the $[A_i, A_{i+1}]$. This results in N being the forward looking point. The desired heading angle is then determined to be the angle between line ON and a fixed reference line (Box 114). This angle is then inputted to the vessel's heading controller as indicated by Box 116. A determination is made as to whether or not the vessel has reached the desired endpoint $A_{i+1}$ of the line segment $[A_i, A_{i+1}]$ as indicated by Box 118. If the vessel has not reached the desired position, the system loops back to the step of Box 104. If the vessel is within a circle of acceptance surrounding the desired endpoint $A_{i+1}$ of the line segment $[A_i, A_{i+1}]$, then the index for the next line segment of the desired trajectory is incremented as shown in Box 120. A determination is made as to whether or not the destination $A_{n+1}$ has been reached (Box 122). If $A_{n+1}$ has been reached the method terminates. If $A_{n+1}$ has not been reached, the method loops back to the steps of Box 102.

Still referring to FIG. 2, the branch illustrating the utilization of drift detection is now described. In the steps of Box 130, the drift $d_r$ of the line segment $[A_i, A_{i+1}]$ is calculated from the cross-track error d and its time derivative. The segment $[A_i, A_{i+1}]$ is then shifted by $d_r$ to obtain the new line segment $[A'_i, A'_{i+1}]$ as indicated by Box 132. The details for calculating $d_r$ are set forth below. Line segment $[A'_i, A'_{i+1}]$ and the vessel center of flotation O will be on opposite sides of $[A_i, A_{i+1}]$. The new radius R of the line-of-sight (LOS) circle is calculated using the exponential formula as set forth above in formulae 1a-c by replacing d with $(d+d_r)$, which is the distance from O to the newly defined segment $[A'_i, A'_{i+1}]$ (Box 134). The intersection points M and N between the LOS circle C(O, R) (center of flotation O, radius R) and $[A'_i, A'_{i+1}]$ are determined as shown in Box 136. The intersection points M, N are used to define a line segment [M, N] having the same sense as the $[A'_i, A'_{i+1}]$. This results in N being the forward looking point.

In a variation of the present embodiment, the current drift of the ship from its desired path, $d_r(t_{k+1})$, is computed as follows:

$$d_r(t_{k+1}) = \text{Not}(\text{flag\_reset}) \cdot [\text{rising\_edge}(\text{flag\_drift}(t_{k+1})) \cdot d \cdot \text{sgn}(\text{location\_orientation}) + d_r(t_k)]$$

where $t_k$ and $t_{k+1}$ are the instants of time corresponding to the previous and current iterations, respectively. The "Not" function is a logic operator. The "rising_edge" function is also a logic operator defined by:

if $a(t_k) = 0$ and $a(t_{k+1}) = 1 \Rightarrow \text{rising\_edge}(a(t_{k+1})) = 1$ else $\Rightarrow \text{rising\_edge}(a(t_{k+1})) = 0$ The "sgn(location_orientation)" variable is introduced to account in the formulation the side in which the ship is located at with respect to the desired trajectory. It is determined by the sign of the $z^{th}$ component of $$OA_i \times OA_{i+1}$$

where O is the center of flotation of the vessel and $A_i$ and $A_{i+1}$ are as set forth above. It should be noted that the "sgn(location_orientation)" is equal to one when z is pointing downward. The "flag_reset" and "flag_drift" are two binary flags that can only assume the numbers 0 and 1. As the name implies, the "flag_reset" is used to reset the value of the drift. It is computed as if $(\|OA_i\| \leq \alpha R_{converge})$ or $(\|OA_{i+1}\| \leq R_{converge}) \Rightarrow$ flag_reset = 1 else flag_reset = 0 where $R_{converge}$ is a design parameter, usually chosen to be a multiple of the ship's length. In a refinement, the recommended starting value for $R_{converge}$ is 1.7 times the length of ship. $\alpha$ is an another design parameter whose value should always be greater than 1. In a refinement, the recommended starting value for $\alpha$ is 3.2. flag_reset is set to 1 whenever the ship is in the vicinity of either one of the way points $A_i$ and $A_{i+1}$. Consequently, the drift algorithm is turned off when the ship maneuvers around the way points. Also, this will allow the system to distinguish between the drift and the ship maneuver around $A_{i+1}$, which usually involves a sharp increase in the cross track error due to switching in the way points.

The flag_drift initiates an instantaneous drift at time $t_{k+1}$. It is computed as follows:

If $(d > \varepsilon_d)$ and $(|d|_{average} < \varepsilon_d)$ and $(\|OA_i\| > \alpha R_{converge})$ and $(\|OA_{i+1}\| > R_{converge})$ then flag_drift = 1 else flag_drift = 0 where $\epsilon_d$ and $\epsilon_{\dot{d}}$ are tolerance design parameters. They are tuned based on the accuracy of the GPS system and the time step $\Delta t = t_{k+1} - t_k$. Based on the above formulation, the flag_drift is set to 1 if the ship is away from its desired path ($d > \epsilon_d$) and the absolute value of the moving average of $\dot{d}$ is near zero (i.e., $|\dot{d}|_{average} < \epsilon_{\dot{d}}$. In addition, the ship should not be in the vicinity of its current way point $A_i$ nor in the vicinity of its next way point $A_{i+1}$. It should be pointed out that the term a in the above formulation is introduced to give the ship enough distance to recover from its maneuver around its newly assigned current way point before the drift algorithm can be activated.

In another embodiment of the present invention, a non-transitory computer readable medium with instruction encoded therein corresponding to one or more of the steps of FIG. 2 is provided. In particular, the computer readable medium is a storage device such as hard drives, optical drives, CDROM, DVDs, and the like.

Figure 3:
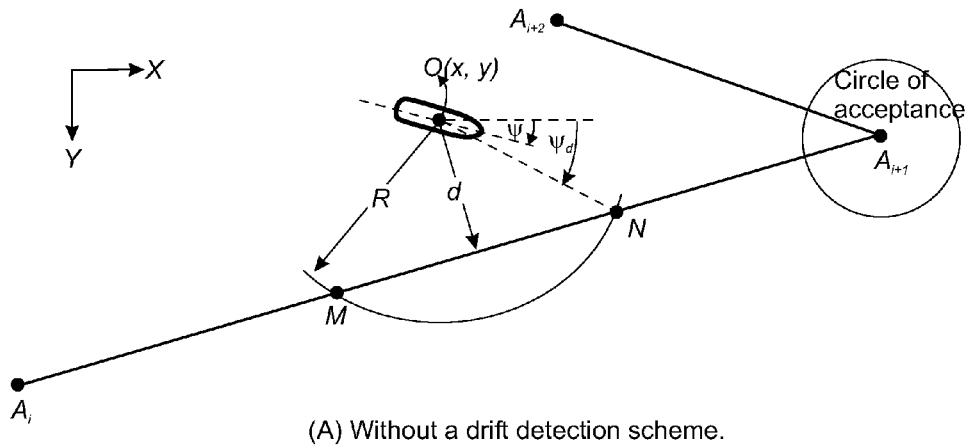
FIGS. 3A and B illustrate the proposed guidance scheme with (A) and without (B) the drift detection algorithm.
Figure 3:
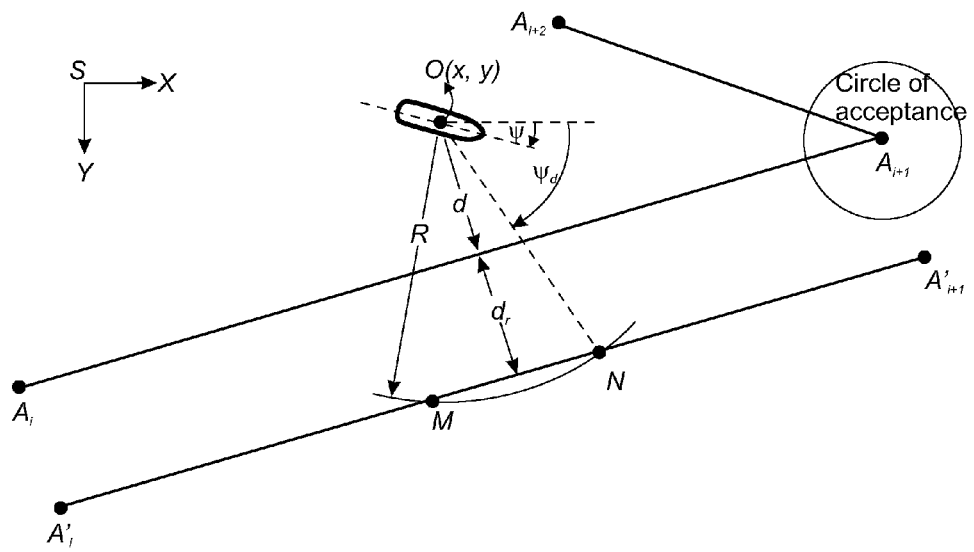
Figure 4:
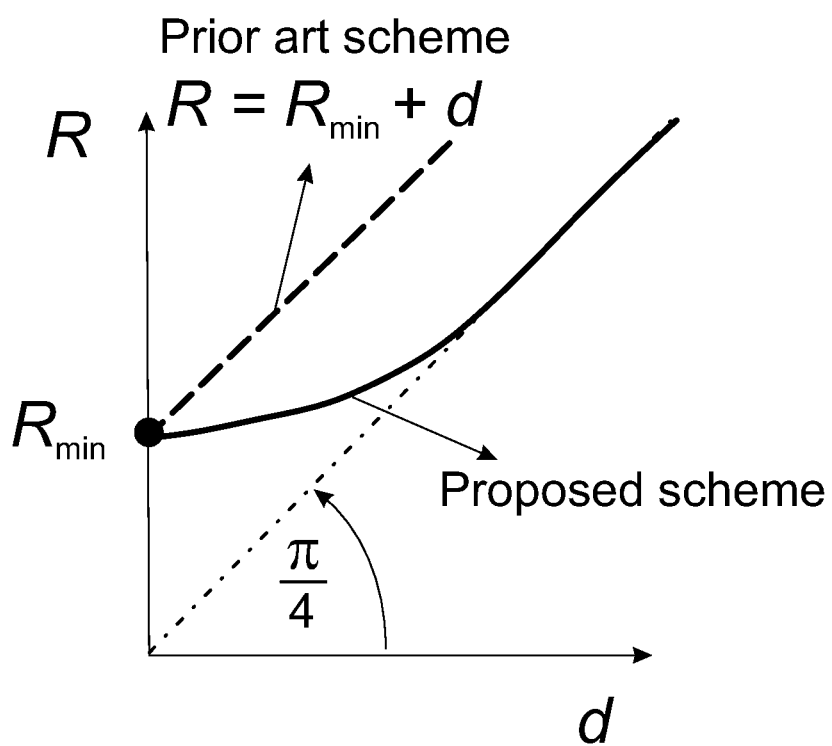
FIG. 4 illustrates linear (prior art) and exponential (proposed scheme) for varying the radius, R, with the cross track error, d.

FIG. 3 illustrates the proposed guidance scheme with and without the drift detection algorithm. $\psi$ is the current heading angle and $\psi_d$ is the desired heading angle. (X, Y) are the coordinates of the point O on the ship with respect to an inertial (fixed) coordinate system. FIG. 4 serves to highlight the difference in varying the radius R between the current art (linear variation) versus the proposed scheme (exponential variation).

Figure 5:
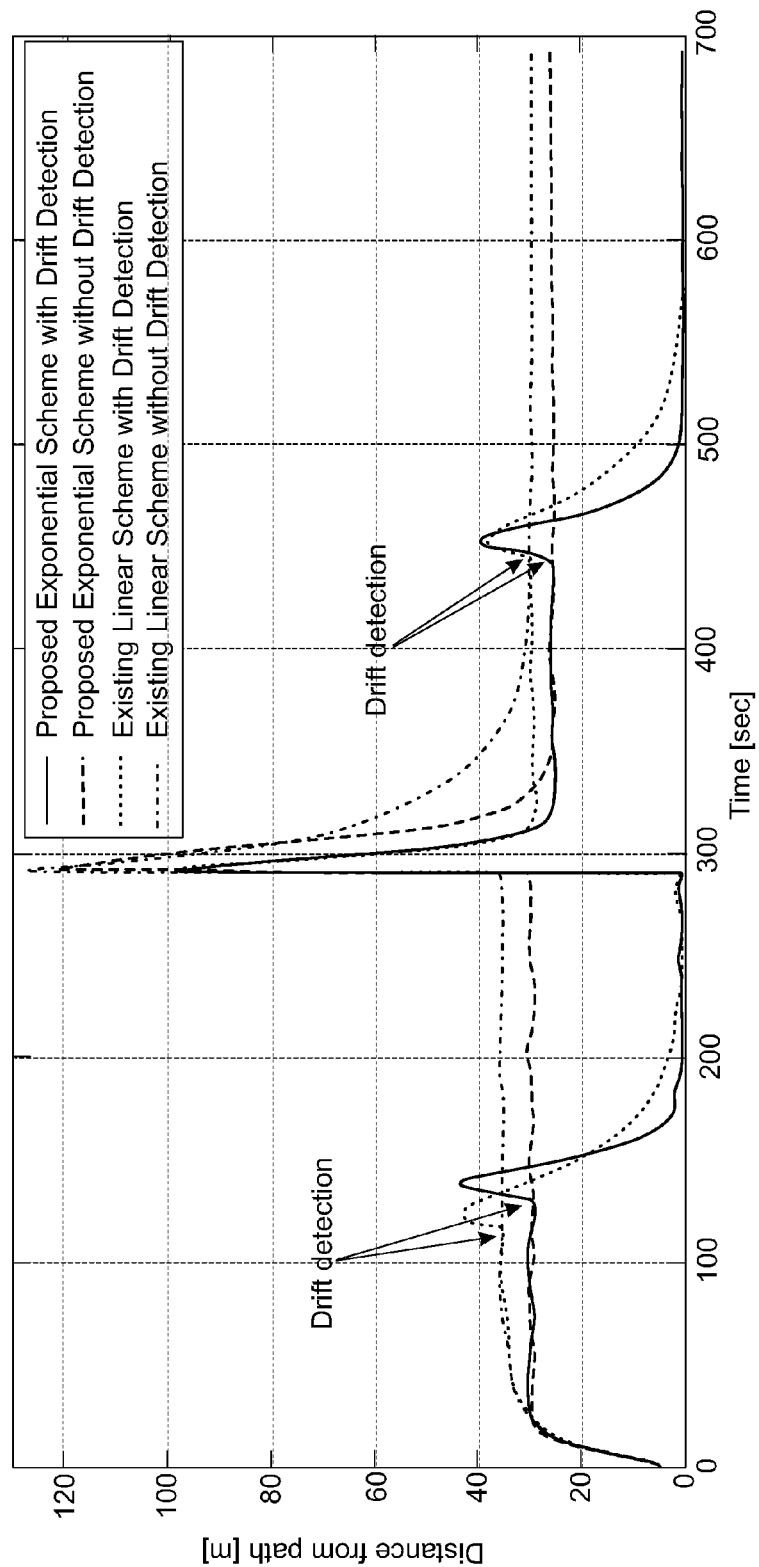
FIG. 5 provides plots showing the capability and advantages of embodiments of the present invention.

The simulation results, shown in FIG. 5, serve to illustrate the advantages and capabilities of the proposed guidance system with a built-in drift detection and compensation scheme. In generating these results, the desired trajectory consisted of two straight segments along which the surge speed was kept constant at 7 m/sec. The ship is considered to have initial position and orientation errors with respect to the desired trajectory. The curves, generated while the drift detection and compensation scheme is de-activated, demonstrate that the proposed guidance system yields a faster convergence rate and smaller steady-state cross track errors than the existing state-of-the-art guidance scheme, which varies the radius linearly. It should be pointed out that the sudden increase in the cross track error, occurred around t=290 sec., is due to the fact that the ship entered the circle of acceptance centered at the second waypoint, $A_2$, which caused the guidance system to switch from tracking $A_1A_2$ segment to $A_2A_3$ segment. Moreover, the remaining curves of FIG. 5 prove that the drift detection and compensation scheme can be applied to eliminate the drift errors in both proposed and existing guidance schemes. However, the implementation of the drift detection and compensation algorithm with the proposed guidance scheme, which varies the radius exponentially, yields a faster recovery from the drift error than the existing guidance system with the drift detection and compensation technique.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A computer implemented method for guiding and controlling a trajectory of an under-actuated vessel, the method comprising:
   a) expressing a predetermined vessel trajectory as a set of straight line segments;
   b) determining a desired current line segment $[A_i, A_{i+1}]$;
   c) determining a current position of the vessel;
   d) determining a cross-track error d and a time derivative of the cross-track error;
   e) calculating radius R of a line-of-sight (LOS) circle using formulae:

$$R = d + \sqrt{2} R'_{min} e^{-bx'_B} \tag{1a}$$

$$R'_{min} = 2^{-0.5} R_{min} d^{2-0.5 b R_{min}} \tag{1b}$$

$$x'_B = b^{-1}[\text{lambertw}(bR'_{min} e^{-(0.5\sqrt{2}bd)}) + 0.5\sqrt{2}bd] \tag{1c}$$

wherein lambertw is the inverse of $f(x) = xe^x$; and
   $R_{min}$ is a minimum radius;
   f) determining intersection points M and N between the LOS circle and the current desired line segment $[A_i, A_{i+1}]$, the intersection points M, N defining a line segment [M, N] having the same sense as the line segment $[A_i, A_{i+1}]$ wherein N is a forward looking point;
   g) determining a desired heading angle to be the angle between line ON and a fixed reference line; and h) inputting the desired heading angle to a vessel's heading controller.

2. The method of claim 1 wherein:
$R_{min}$ is 1.7L;
L is a length of the vessel; and
b is 0.05.

3. The method of claim 1 further comprising:
i) determining if the vessel has reached endpoint $A_{i+1}$ of the line segment $[A_i, A_{i+1}]$;
j) if the vessel has not reached the desired position, the method loops back to step c);
k) if the vessel has reached desired endpoint $A_{i+1}$ of the line segment $[A_i, A_{i+1}]$, then an index is incremented to the next line segment of a desired trajectory; and
l) determining if destination $A_{n+1}$ has been reached, if $A_{n+1}$ has been reached the loop is terminated, else loop back to step b).

4. The method of claim 1 wherein drift is detected prior to step e) to correct the desired heading angle.

5. The method of claim 4 wherein drift is calculated by:
calculating drift $d_r$ of line segment $[A_i, A_{i+1}]$ from the cross-track error d and its time derivative;
shifting segment $[A_i, A_{i+1}]$ by $d_r$ to obtain a new line segment $[A'_i, A'_{i+1}]$ wherein line segment $[A'_i, A'_{i+1}]$ and a vessel center of flotation O are on opposite sides of $[A_i, A_{i+1}]$;
calculating radius R of the line-of-sight (LOS) circle using the exponential formula:

$$R = d + \sqrt{2} R'_{min} e^{-bx'_B} \quad (1a)$$

$$R'_{min} = 2^{-0.5} R_{min} d^{2^{-0.5} bR_{min}} \quad (1b)$$

$$x'_B = b^{-1}[\text{lambertw}(bR'_{min} e^{-(0.5\sqrt{2}bd)}) + 0.5\sqrt{2}bd] \quad (1c)$$

wherein lambertw is the inverse of $f(x) = xe^x$, $R_{min}$ is the minimum radius, b is a parameter controlling a decay rate of the exponential term, and d is substituted by $(d+d_r)$, which is a distance from O to a newly defined segment $[A'_i, A'_{i+1}]$;
determining intersection points M and N between the LOS circle C(O, R) (center of flotation of the vessel O, radius R) and $[A'_i, A'_{i+1}]$; and
using intersection points M and N to define a line segment [M, N] having the same sense as $[A'_i, A'_{i+2}]$, being a forward looking point.

6. The method of claim 5 wherein:
$R_{min}$ is 1.7L;
L is a length of the vessel; and
b is 0.05.

7. The method of claim 1 wherein the vessel is an under-actuated marine ship or other autonomous platform.

8. A non-transitory computer readable medium encoded instructions that execute the method of claim 1.

9. A system for guiding and controlling a trajectory for an under-actuated vessel comprising a computer processor, memory, and digital storage devices, the computer processor executing a method comprising:
a) expressing a predetermined vessel trajectory as a set of straight line segments;
b) determining a desired current line segment $[A_i, A_{i+1}]$;
c) determining a current position of the vessel;
d) determining a cross-track error d and a time derivative of the cross-track error;
e) calculating radius R of a line-of-sight (LOS) circle using formulae:

$$R = d + \sqrt{2} R'_{min} e^{-bx'_B} \quad (1a)$$

$$R'_{min} = 2^{-0.5} R_{min} d^{2^{-0.5} bR_{min}} \quad (1b)$$

$$x'_B = b^{-1}[\text{lambertw}(bR'_{min} e^{-(0.5\sqrt{2}bd)}) + 0.5\sqrt{2}bd] \quad (1c)$$

wherein lambertw is the inverse of $f(x) = xe^x$;
$R_{min}$ is the minimum radius; and
b is a parameter controlling a decay rate of the exponential term;
f) determining intersection points M and N between the LOS circle and the current desired line segment $[A_i, A_{i+1}]$, the intersection points M, N defining a line segment [M, N] having the same sense as the line segment $[A_i, A_{i+1}]$ wherein N is a forward looking point;
g) determining a desired heading angle to be the angle between line ON and a fixed reference line; and
h) inputting the desired heading angle to a vessel's heading controller.

10. The system of claim 9 wherein:
$R_{min}$ is 1.7L;
L is a length of the vessel; and
b is 0.05.

11. The system of claim 9 wherein the method further comprises:
i) determining if the vessel has reached endpoint $A_{i+1}$ of the line segment $[A_i, A_{i+1}]$;
j) if the vessel has not reached the desired position, the system loops back to step c);
k) if the vessel has reached desired endpoint $A_{i+1}$ of the line segment $[A_i, A_{i+1}]$, then an index is incremented to the next line segment of a desired trajectory; and
l) determining if destination $A_{n+1}$ has been reached, if $A_{n+1}$ has been reached terminating, else loop back to step b).

12. The system of claim 9 further comprising a heading controller that determines a rudder angle control torque for a rudder to achieve the desired heading angle.

13. The system of claim 9 wherein drift is detected prior to step e) to correct the desired heading angle.

14. The system of claim 13 wherein drift is calculated by:
calculating drift $d_r$ of line segment $[A_i, A_{i+1}]$ from the cross-track error d and its time derivative;
shifting segment $[A_i, A_{i+1}]$ by $d_r$ to obtain a new line segment $[A'_i, A'_{i+1}]$ wherein line segment $[A'_i, A'_{i+1}]$ and vessel origin O are on opposite sides of $[A_i, A_{i+1}]$;
calculating radius R of a line-of sight (LOS) circle using the exponential formula:

$$R = d + \sqrt{2} R'_{min} e^{-bx'_B} \quad (1a)$$

$$R'_{min} = 2^{-0.5} R_{min} d^{2^{-0.5} bR_{min}} \quad (1b)$$

$$x'_B = b^{-1}[\text{lambertw}(bR'_{min} e^{-(0.5\sqrt{2}bd)}) + 0.5\sqrt{2}bd] \quad (1c)$$

wherein lambertw is the inverse of $f(x) = xe^x$, $R_{min}$ is the minimum radius, b is a parameter controlling a decay rate of the exponential term, and d is substituted by $(d+d_r)$, which is a distance from O to a newly defined segment $[A'_i, A'_{i+1}]$;
determining intersection points M and N between the LOS circle C(O, R) (center O, radius R) and the current desired line segment $[A_i, A_{i+1}]$; and
using intersection points M, N to define a line segment [M, N] having the same sense as the line segment $[A_i, A_{i+1}]$, N being a forward looking point.

15. The system of claim 14 wherein:
$R_{min}$ is 1.7L;
L is a length of the vessel; and
b is 0.05.

16. The system of claim 9 wherein the vessel is an under-actuated marine surface ship or another autonomous platform.

* * * * *

UNITED STATES PATENT AND TRADEMARK OFFICE
CERTIFICATE OF CORRECTION

PATENT NO. : 9,213,336 B2
APPLICATION NO. : 13/821631
DATED : December 15, 2015
INVENTOR(S) : Nabil Chalhoub et al.

It is certified that error appears in the above-identified patent and that said Letters Patent is hereby corrected as shown below:

In the claims,

Column 6, Line 56, Claim 1:
After "$2^{-0.5} R_{min}$"
Delete " $d^{2^{-0.5}bR_{min}}$ " and
Insert -- $e^{2^{-0.5}bR_{min}}$ --.

Column 7, Line 30, Claim 5:
After "$2^{-0.5} R_{min}$"
Delete " $d^{2^{-0.5}bR_{min}}$ " and
Insert -- $e^{2^{-0.5}bR_{min}}$ --.

Column 7, Line 41, Claim 5:
After "same sense"
Delete "[A'$_i$, A'$_{i+2}$]" and
Insert -- [A'$_i$, A'$_{i+1}$], N --.

Column 7, Line 64, Claim 9:
After "$2^{-0.5} R_{min}$"
Delete " $d^{2^{-0.5}bR_{min}}$ " and
Insert -- $e^{2^{-0.5}bR_{min}}$ --.

Column 8, Line 45, Claim 14:
After "$2^{-0.5} R_{min}$"
Delete " $d^{2^{-0.5}bR_{min}}$ " and
Insert -- $e^{2^{-0.5}bR_{min}}$ --.

Signed and Sealed this
Twenty-eighth Day of June, 2016

Michelle K. Lee
*Director of the United States Patent and Trademark Office*